(12) United States Patent
Tawada et al.

(10) Patent No.: US 12,095,385 B2
(45) Date of Patent: Sep. 17, 2024

(54) POWER CONVERSION DEVICE THAT CALCULATES AN ESTIMATED VALUE OF AN UPPER IMPEDANCE

(71) Applicant: TMEIC Corporation, Chuo-ku (JP)

(72) Inventors: Yoshihiro Tawada, Tokyo (JP); Kenta Yamabe, Tokyo (JP)

(73) Assignee: TMEIC Corporation, Chuo-ku (JP)

( * ) Notice: Subject to any disclaimer, the term of this patent is extended or adjusted under 35 U.S.C. 154(b) by 126 days.

(21) Appl. No.: 17/754,533

(22) PCT Filed: Mar. 12, 2020

(86) PCT No.: PCT/JP2020/010916
§ 371 (c)(1),
(2) Date: Apr. 5, 2022

(87) PCT Pub. No.: WO2021/181629
PCT Pub. Date: Sep. 16, 2021

(65) Prior Publication Data
US 2023/0155519 A1    May 18, 2023

(51) Int. Cl.
*H02M 7/48*    (2007.01)
*H02M 1/00*    (2006.01)

(52) U.S. Cl.
CPC ........... *H02M 7/48* (2013.01); *H02M 1/0009* (2021.05); *H02J 2300/26* (2020.01)

(58) Field of Classification Search
CPC ........ H02M 7/48; H02M 7/42; H02M 7/4815; H02M 7/4818; H02J 2300/22; H02J 2300/24; H02J 2300/26
See application file for complete search history.

(56) References Cited

U.S. PATENT DOCUMENTS

| 2015/0103572 A1* | 4/2015 | Jean | H02M 7/04 |
| | | | 363/55 |
| 2017/0117816 A1* | 4/2017 | Ohta | H02M 1/14 |
| (Continued) | | | |

FOREIGN PATENT DOCUMENTS

JP    2019-106843 A    6/2019

OTHER PUBLICATIONS

International Search Report and Written Opinion issued Jun. 30, 2020 in PCT/JP2020/010916 filed Mar. 12, 2020, 10 pages.

(Continued)

*Primary Examiner* — Alex Torres-Rivera
(74) *Attorney, Agent, or Firm* — Oblon, McClelland, Maier & Neustadt, L.L.P.

(57) ABSTRACT

A power conversion device including a power conversion circuit, an AC filter circuit, and a calculation unit. The power conversion circuit converts DC input power from a DC power supply to output a first AC output current and a first AC output voltage. The AC filter circuit filters the first AC output current and the first AC output voltage to generate a second AC output current and a second AC output voltage. The calculation unit calculates an estimated value of an upper impedance based on a difference value between a first voltage value and a second voltage value, the first voltage value being a value of the second AC output voltage at a time of stop of the power conversion circuit or at a time of zero output from the power conversion circuit or at a time of a certain amount of output from the power conversion circuit.

5 Claims, 2 Drawing Sheets

(56) References Cited

U.S. PATENT DOCUMENTS

2018/0041122 A1\* 2/2018 Tsai .......................... G05D 9/12
2019/0190402 A1\* 6/2019 Kamatani ......... H02M 7/53871
2020/0099315 A1\* 3/2020 Lee .................. H02M 7/53871

OTHER PUBLICATIONS

Office Action issued Apr. 24, 2024 in India Patent Application No. 202217056977, with concise English translation.

\* cited by examiner

$I_1 = i_{inv}$, $V_{Z3} = V_{out}$

FIG. 3

$I_3 = i_{out}$, $V_{Z3} = V_{out}$

POWER CONVERSION DEVICE THAT CALCULATES AN ESTIMATED VALUE OF AN UPPER IMPEDANCE

FIELD

The present disclosure relates to a power conversion device.

BACKGROUND

Power conversion devices are connected to power systems via upper impedances. There may be provided a host monitoring device for integrated system control on the power system side. The host monitoring device is often connected to sensors that measure current-voltage measurement values on the power system side. The host monitoring device can calculate an actually measured value of the upper impedance from the measured values of these sensors.

In contrast, the power conversion device itself cannot directly acquire current-voltage measurement values in the vicinity of the upper impedance. Therefore, the power conversion device cannot directly measure the upper impedance. This point is different from the host monitoring device.

In this regard, as described in JP 2019-106843A, a technique for giving an impedance estimation function to a power conversion device itself is conventionally known. In the conventional technique, a disturbance signal is intentionally output from the power conversion device to the power system. Examination of a response to this disturbance signal enables estimation of the impedance (that is, the upper impedance) of the load to which the power conversion device is connected.

CITATION LIST

Patent Literature

[PTL 1] JP 2019-106843A

SUMMARY

Technical Problem

However, in the conventional technique, in order to estimate the upper impedance, it is necessary to cause the power conversion device to output a disturbance signal and to detect the response to the disturbance signal from the power system side. The output of the disturbance signal is a special operation different from the normal power conversion operation. There is a problem in which efficient power conversion operation is hindered by the need for such a special operation.

The present disclosure has been made to solve the above-mentioned problems, and an object of the present disclosure is to provide a power conversion device having a function of estimating an upper impedance while preventing power conversion operation from being hindered.

Solution to Problem

A power conversion device according to the present disclosure includes: a power conversion circuit configured to convert direct current (DC) input power from a DC power supply to output a first alternating current (AC) output current and a first AC output voltage; an AC filter circuit connected in series to the power conversion circuit, the AC filter circuit configured to filter the first AC output current and the first AC output voltage to generate a second AC output current and a second AC output voltage, the second AC output current being output from a connection point between a reactor and a capacitor of the AC filter circuit, the second AC output voltage being applied to the capacitor; and a calculation unit constructed to calculate an estimated value of an upper impedance based on a difference value between a first voltage value and a second voltage value, the first voltage value being a value of the second AC output voltage at a time of stop of the power conversion circuit, or at a time of zero output from the power conversion circuit or at a time of a certain amount of output from the power conversion circuit, the second voltage value being a value of the second AC output voltage during operation in which the power conversion circuit outputs output power.

Advantageous Effects of Invention

A system voltage that appears on the other side of the upper impedance when viewed from the power conversion device is also referred to as "upper system voltage" for convenience. The time of stop of the power conversion circuit or the time of zero output thereof is also referred to as a "no-output state" for convenience. The second AC output voltage in the no-output state may be used as an estimated value of the upper system voltage. Utilization of this idea to obtain the difference value between the first voltage value and the second voltage value makes it possible to solve equations for calculating the upper impedance. Since the no-output state does not require the power conversion device to perform an uncommon control operation such as generation of disturbance, the decrease in efficiency of the power conversion operation is prevented. Therefore, the estimated value of the upper impedance can be calculated without hindering functioning during operation of the power conversion device.

DESCRIPTION OF EMBODIMENTS

Configuration of Device of Embodiments

Figure 1:
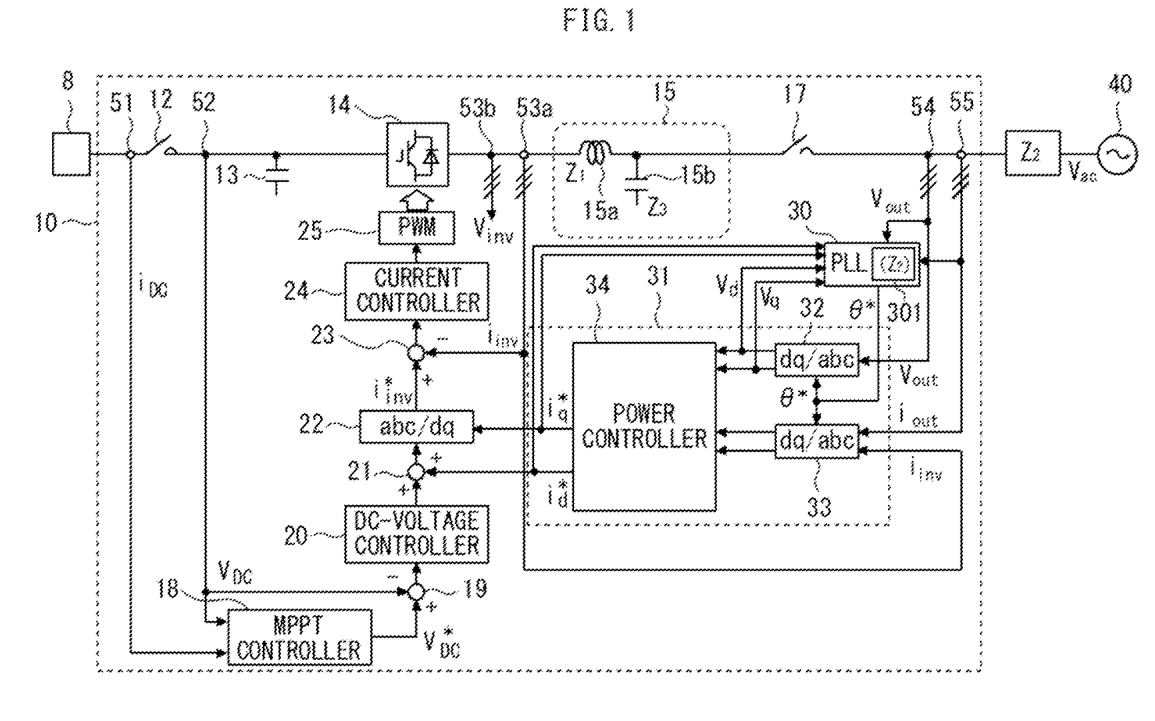
FIG. 1 is a diagram showing a configuration of a power conversion device according to an embodiment.

FIG. 1 is a diagram showing a configuration of a power conversion device 10 according to an embodiment. As shown in FIG. 1, the power conversion device 10 is provided so as to be interposed between a direct current (DC) power supply device 8 and a power grid 40.

The power conversion device 10 includes a DC side relay 12, a DC capacitor 13, a power conversion circuit 14, an alternating current (AC) filter circuit 15, and an AC side relay 17. The power conversion device 10 further includes an instrument current transformer (CT) 51, an instrument voltage transformer (VT) 52, an instrument current transformer (CT) 53a, an instrument voltage transformer (CT) 53b, an instrument voltage transformer (VT) 54, and an instrument current transformer (CT) 55.

The AC filter circuit 15 includes an AC reactor 15a and an AC capacitor 15b. In the following description, the impedance of the AC reactor 15a is denoted by "$Z_1$", and the impedance of the AC capacitor 15b is denoted by "$Z_3$". In addition, the upper impedance between the power conversion device 10 and the power grid 40 is denoted by "$Z_2$". The upper impedance $Z_2$ may be referred to as "system impedance $Z_2$".

The power conversion device 10 further includes a maximum power point tracking (MPPT) controller 18, a first subtractor 19, a DC-voltage controller 20, a first adder 21, a first coordinate conversion unit 22, a second subtractor 23, a current controller 24, and a pulse width modulation (PWM) drive circuit 25.

The power conversion device 10 further includes a phase-locked loop (PLL) circuit) 30 and a power control command value calculation unit 31.

The power conversion device 10 includes a calculation unit 301 that calculates an estimated value of the upper impedance $Z_2$. In the embodiment, as an example, the calculation unit 301 is built in the PLL circuit 30.

The DC side relay 12 is connected to the DC power supply device 8. DC input power from the DC power supply device 8 is received by a first end of the DC side relay 12.

The DC power supply device 8 may be a power supply of either a solar cell panel or a storage battery, or may include both power supplies, for example. The storage battery may include various known secondary batteries or fuel cells. A wind power generator with an AC-DC converter device may be the DC power supply device 8. The DC power supply device 8 may be various renewable energy power generation devices.

A power conversion circuit 14 is interposed between the DC power supply device 8 and the power grid 40 to form a series circuit together with these. This power grid is also commonly referred to as a power system. The power system is a system for supplying electric power to a consumer's power receiving equipment. The power system is a system that integrates power generation, power transformation, power transmission, and power distribution.

The instrument current transformer (CT) 51 converts a direct current $i_{DC}$ into a value for an instrument. The direct current $i_{DC}$ is a current that flows between the DC power supply device 8 and the power conversion circuit 14. The instrument voltage transformer (VT) 52 converts a DC voltage $V_{DC}$ into a value for an instrument. The DC voltage $V_{DC}$ is a voltage between the DC power supply device 8 and the power conversion circuit 14, and is the voltage of the DC capacitor 13.

The power conversion circuit 14 converts between DC power and AC power. The DC end of the power conversion circuit 14 is connected to a second end of the DC side relay 12. The power conversion circuit 14 may be, for example, a three-phase voltage type inverter circuit including a plurality of semiconductor switching elements. However, as a modified example, the power conversion circuit 14 may be a single-phase or two-phase voltage type inverter circuit.

The power conversion circuit 14 outputs a first AC output current and a first AC output voltage by converting the DC input power from the DC power supply device 8. For convenience of explanation, this first AC output current is also referred to as "inverter output current $i_{inv}$", and this first AC output voltage is also referred to as "inverter output voltage $V_{inv}$".

The instrument current transformer (CT) 53a converts the inverter output current $i_{inv}$ into a value for an instrument. The inverter output current $i_{inv}$ is a three-phase AC output current that flows between the power conversion circuit 14 and the AC reactor 15a. The instrument voltage transformer (CT) 53b converts the inverter output voltage $V_{inv}$ into a value for an instrument. The inverter output voltage $V_{inv}$ is a three-phase AC output voltage of the power conversion circuit 14.

A first end of the DC capacitor 13 is connected to wiring (for example, busbars) between the DC side relay 12 and the power conversion circuit 14. A second end of the DC capacitor 13 is connected to a reference potential such as ground. The DC capacitor 13 is charged by the DC voltage $V_{DC}$ that appears on the DC side of the power conversion circuit 14.

The AC filter circuit 15 is connected to the power conversion circuit 14. In the embodiment, the AC filter circuit 15 is an LC filter circuit in which the AC reactor 15a and the AC capacitor 15b are connected in an L shape. Although simplified in FIG. 1, actually output wiring lines for three phases extend on the output side of the power conversion circuit 14. Actually, a pair of an AC reactor 15a and an AC capacitor 15b are provided for each of the output wiring lines for the three phases.

The AC reactor 15a is connected in series to the AC end of the power conversion circuit 14. A first end of the AC side relay 17 is connected to the AC reactor 15a. A second end of the AC side relay 17 is connected to the power grid 40. A first end of the AC capacitor 15b is connected to wiring (for example, busbars) connecting the AC reactor 15a and the AC side relay 17. A second end of the AC capacitor 15b is connected to a reference potential such as ground.

The AC filter circuit 15 filters the first AC output current (that is, the inverter output current $i_{inv}$) and the first AC output voltage (that is, the inverter output voltage $V_{inv}$). This filtration causes the AC filter circuit 15 to generate a second AC output current and a second AC output voltage. For convenience of explanation, this second AC output current is also referred to as "AC output current $i_{out}$", and this second AC output voltage is also referred to as "AC output voltage $V_{out}$". The AC output current $i_{out}$ is a current flowing through the connection point between the AC reactor 15a and the AC capacitor 15b. The AC output voltage $V_{out}$ is a voltage applied to the AC capacitor 15b.

The instrument voltage transformer (VT) 54 converts the AC output voltage $V_{out}$ into a value for an instrument. The AC output voltage $V_{out}$ is a three-phase AC voltage between the AC filter circuit 15 and the upper impedance $Z_2$. The instrument current transformer (CT) 55 converts the AC output current $i_{out}$ into a value for an instrument. The AC output current $i_{out}$ is a three-phase alternating current between the AC filter circuit 15 and the upper impedance $Z_2$.

The MPPT controller 18 is omitted in the case where the DC power supply device 8 is other than PV, a command value $V^*_{DC}$ is input to the MPPT controller 18. In the case where the MPPT controller 18 is enable, the direct current $i_{DC}$ and the DC voltage $V_{DC}$ are input to the MPPT controller 18. The first subtractor 19 calculates the difference between a command value $V^*_{DC}$ output by the MPPT controller 18 and the DC voltage $V_{DC}$. The MPPT controller 18 takes out the maximum DC power from the DC power supply device 8 by MPPT control.

The DC-voltage controller 20 performs DC voltage control based on the subtraction result of the first subtractor 19. The first adder 21 adds the output value of the DC-voltage controller 20 and a d-axis current command value $i^*_d$. The d-axis current command value $i^*_d$ is a command value output by a power controller 34 to be described below.

The first coordinate conversion unit 22 performs dq-axis/abc-axis conversion, that is, coordinate conversion from two phases to three phases. The first coordinate conversion unit 22 calculates an inverter current command value $i^*_{inv}$ based on the addition result of the first adder 21 and a q-axis current command value $i^*_q$. The q-axis current command value $i^*_q$ is a command value output by the power controller 34 to be described below.

The second subtractor 23 calculates the difference between the inverter current command value $i^*_{inv}$ and the inverter output current $i_{inv}$.

The current controller 24 calculates a current command value based on the output of the second subtractor 23. The PWM drive circuit 25 generates a pulse width modulation signal (PWM signal) according to the current command value of the current controller 24. The PWM drive circuit 25 transmits this PWM signal to the power conversion circuit 14 as a drive signal of the semiconductor switching element.

The PLL circuit 30 outputs a phase command value θ* based on the phase of the AC output voltage $V_{out}$. Specifically, the PLL circuit 30 outputs the phase command value θ* based on the AC output voltage $V_{out}$, a d-axis output voltage $V_d$, and a q-axis output voltage $V_q$. The d-axis output voltage $V_d$ and the q-axis output voltage $V_q$ are output from a second coordinate conversion unit 32 to be described below.

The PLL circuit 30 receives an AC output current from the power controller 34 to be described below. In addition, the PLL circuit 30 also acquires the estimated value of the upper impedance $Z_2$ calculated by the calculation unit 301. The PLL circuit 30 calculates a phase correction amount Δθ based on the estimated value of the upper impedance $Z_2$ and the AC output current. The PLL circuit 30 is constructed so as to correct the phase command value θ* with this phase correction amount Δθ.

The power control command value calculation unit 31 calculates a power control command value based on the phase command value θ* from the PLL circuit 30. The power control command value is used to control the power conversion circuit 14. In the embodiment, the power control command value specifically includes a d-axis current command value $i^*_d$ and a q-axis current command value $i^*_q$. The power control command value calculation unit 31 calculates the d-axis current command value $i^*_d$ and the q-axis current command value $i^*_q$ based on the phase command value θ* from the PLL circuit 30, the AC output voltage $V_{out}$, the AC output current $i_{out}$, and the inverter output current $i_{inv}$.

The power control command value calculation unit 31 may include a direct to alternating current conversion (DC/AC conversion) mode and an alternating to direct current conversion (AC/DC conversion) mode. In the direct to alternating current conversion mode, the power control command value calculation unit 31 calculates the power control command value so that the power conversion circuit 14 converts the DC power into the AC power. In the alternating to direct current conversion mode, the power control command value calculation unit 31 calculates the power control command value so that the power conversion circuit 14 converts the AC power into the DC power.

The power control command value calculation unit 31 includes a second coordinate conversion unit 32, a third coordinate conversion unit 33, and a power controller 34.

The second coordinate conversion unit 32 performs abc-axis/dq-axis conversion, that is, conversion from three phases to two phases. As a result, the second coordinate conversion unit 32 calculates the d-axis output voltage $V_d$ and the q-axis output voltage $V_q$ from the AC output voltage $V_{out}$.

The third coordinate conversion unit 33 performs abc-axis/dq-axis conversion, that is, conversion from three phases to two phases. As a result, the third coordinate conversion unit 33 calculates the d-axis output current $i_d$ and the q-axis output current $i_q$ from the AC output current $i_{out}$ and the inverter output current $i_{inv}$ respectively.

The power controller 34 calculates the d-axis current command value $i^*_d$ and the q-axis current command value $i^*_q$ based on the calculated values $V_d$ and $V_q$ of the second coordinate conversion unit 32 and the calculated values $i_d$ and $i_q$ of the third coordinate conversion unit 33.

Upper Impedance Estimation Technique of Embodiment

First Estimation Method

Figure 2:
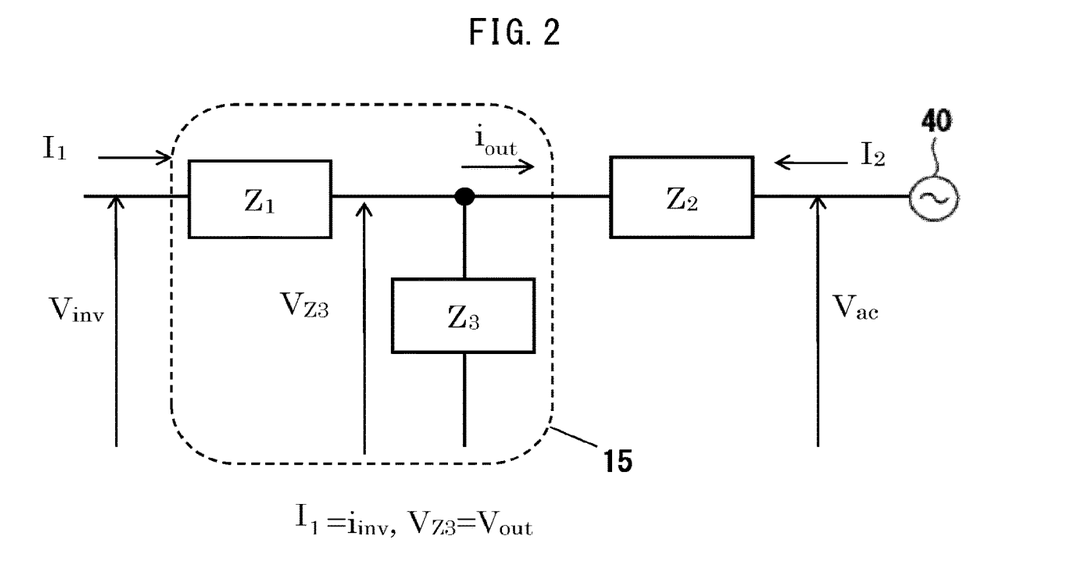
FIG. 2 is a circuit diagram for explaining an upper impedance estimation technique in a power conversion device according to the embodiment.

FIG. 2 is a circuit diagram for explaining an upper impedance estimation technique in the power conversion device 10 according to the embodiment. A first estimation method according to the embodiment is described below with reference to FIG. 2.

FIG. 2 is a circuit diagram schematically showing the AC side circuit configuration of the power conversion device 10. Because the circuit elements of the AC filter circuit 15 are known, the values of $Z_1$ and $Z_3$ in FIG. 2 are known. The system voltage that appears on the other side of the upper impedance $Z_2$ when viewed from the power conversion device 10 is also referred to as "upper system voltage $V_{ac}$" for convenience.

In FIG. 2, a current $I_1$ flowing into the impedance $Z_1$ may be detected based on the inverter output current $i_{inv}$. A voltage $V_{Z3}$ applied to the impedance $Z_3$ in FIG. 2 may be detected based on the AC output voltage $V_{out}$. Therefore, as these values, the measured values of the current and voltage acquired through the instrument current transformer 53a and the instrument voltage transformer 54 may be used.

Equations (1) and (2) are derived from the circuit diagram of FIG. 2.

[Math. 1]
$$\begin{bmatrix} V_{inv} \\ V_{ac} \end{bmatrix} = \begin{bmatrix} Z_1 + Z_3 \vert_{I_2=0} & Z_3 \vert_{I_1=0} \\ Z_3 \vert_{I_2=0} & Z_2 + Z_3 \vert_{I_1=0} \end{bmatrix} \begin{bmatrix} I_1 \\ I_2 \end{bmatrix} \quad (1)$$

[Math. 2]
$$Z_2 = \frac{(V_{inv} - Z_1 I_1 - V_{ac})Z_3}{\{(Z_3 + Z_1)I_1 - V_{inv}\}} \quad (2)$$

Furthermore, by substituting equations (3) and (4) into the equation (2), the equation (5) is derived.

[Math. 3]
$$V_{Z3} = V_{inv} - Z_1 I_1 \quad (3)$$

[Math. 4]
$$\Delta V = V_{Z3} - V_{ac} \quad (4)$$

[Math. 5]
$$Z_2 = \frac{\Delta V Z_3}{(Z_3 I_1 - V_{Z3})} \quad (5)$$

According to the equation (5), the upper impedance $Z_2$ can be estimated using the values $I_1$, $V_{Z3}$, $Z_1$ and $Z_3$. The numerator of the equation (5) includes a value obtained by multiplying the difference value $\Delta V$ by the impedance $Z_3$. The denominator of the equation (5) includes a difference obtained by subtracting $V_{Z3}$ during operation of the power conversion circuit 14 from the multiplication value of the value $I_1$ and the impedance $Z_3$. A fraction predetermined to have these numerator and denominator is the equation (5).

The difference value $\Delta V$ shown in the equation (4) is the difference between the voltage $V_{Z3}$ of the AC capacitor 15b during operation of the power conversion circuit 14 and the estimated value of the upper system voltage $V_{ac}$. The voltage $V_{Z3}$ can be measured by measuring the AC output voltage $V_{out}$ via the instrument voltage transformer 54. On the other hand, the upper system voltage $V_{ac}$ is a voltage that appears on the other side of the upper impedance $Z_2$ and is outside the power conversion device 10. Therefore, the power conversion device 10 itself cannot directly measure the magnitude of the upper system voltage $V_{ac}$.

A time of stop of the power conversion circuit 14 or a time of zero output thereof is also referred to as a "no-output state" for convenience. "The time of stop" is a state in which the drive of the power conversion circuit 14 is completely stopped, for example, in a night stop mode, in an abnormal time protection stop mode, or during maintenance. "The time of zero output" includes an operation in which output power of the power conversion circuit 14 is temporarily reduced to zero due to the intentional setting of an active power command value to zero, or due to occurrence of an unintended instantaneous voltage drop.

Attention is now paid to the voltage $V_{Z3}$ of the AC capacitor 15b of the AC filter circuit 15 in the no-output state. In the no-output state, there is no potential difference between both ends of the upper impedance $Z_2$, $\Delta V=0$ in the equation (4), and the AC output current $i_{out}$ does not flow. The voltage $V_{Z3}$ in the circuit diagram of FIG. 2 shows a voltage value that has no phase difference and is equal to the upper system voltage $V_{ac}$ under no-output state. Under no-output state, the AC output voltage $V_{out}$ and the voltage $V_{Z3}$ of the AC capacitor 15b are substantially equal. That is, the voltage $V_{Z3}$ of the AC capacitor 15b measured in the no-output state may be used as an estimated value of the upper system voltage $V_{ac}$. According to these ideas, the power conversion device 10 can indirectly detect the magnitude of the upper system voltage $V_{ac}$.

The calculation unit 301 according to the embodiment obtains the difference value $\Delta V$ in the equation (4) as follows. The difference value $\Delta V$ is calculated based on a "first voltage value" and a "second voltage value" described below.

First, the PLL circuit 30 acquires the AC output voltage $V_{out}$ in the no-output state as the "first voltage value". Based on this first voltage value, the PLL circuit 30 calculates a first calculation result including a first phase $\theta_1$ and a first amplitude $A_1$. The first calculation result may be recorded in a non-volatile memory or the like inside the PLL circuit 30. This first voltage value may be acquired during operation in which the power conversion circuit 14 is outputting the output power. In that case, the amount of output power at the time of acquisition is also recorded.

Furthermore, the PLL circuit 30 acquires the AC output voltage $V_{out}$ as the "second voltage value" during operation in which the power conversion circuit 14 is outputting the output power. In order to acquire the second voltage value, a plurality of different output power values that are not zero may be preset, and the power conversion circuit 14 may be controlled so as to output the output power according to the plurality of output power values. A plurality of second voltage values may be acquired corresponding to each of the plurality of output power values. Based on the one or the plurality of second voltage values, the PLL circuit 30 calculates a second calculation result including a second phase $\theta 2$ and a second amplitude A2. The second calculation result may also be recorded in a non-volatile memory or the like inside the PLL circuit 30.

The PLL circuit 30 calculates the difference value $\Delta V$ from the recorded first calculation result and the second calculation result. The difference value $\Delta V$ represents the respective differences in the phase and the amplitude. Equations (1) to (5) can be solved from the difference value $\Delta V$ and the above-mentioned known circuit parameters and the measured values. When the first voltage value is measured during operation, correcting the output power value at the time of measurement with the power value at the time of measurement from the calculation results of equations (1) to (5) will make the upper impedance $Z_2$ equivalent to that of when the first voltage value is equipment to that at the time of stop or the output voltage is at zero.

Second Estimation Method

Figure 3:
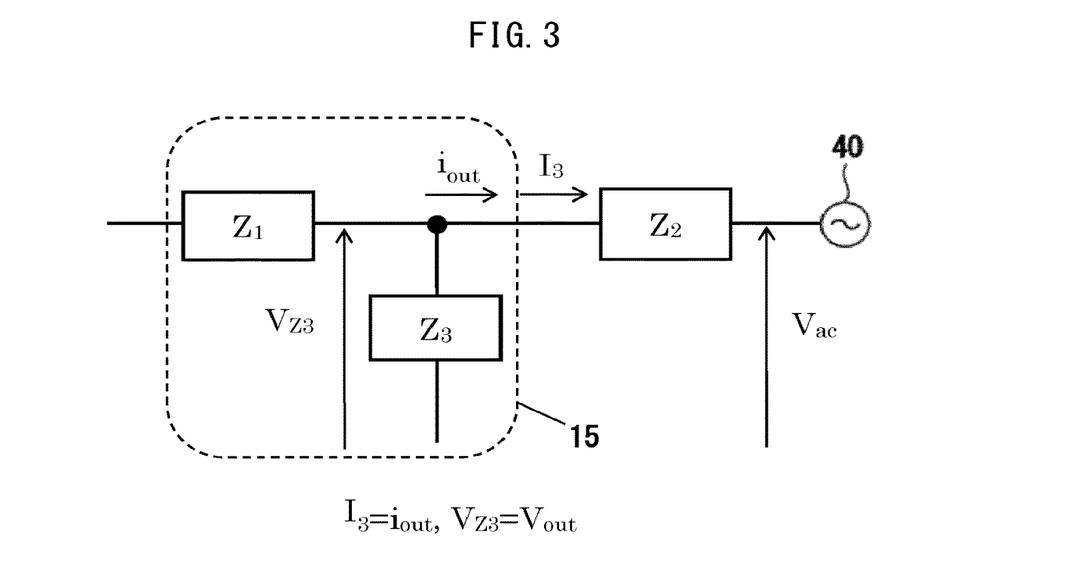
FIG. 3 is a circuit diagram for explaining an upper impedance estimation technique in a power conversion device according to a modified example of the embodiment.

FIG. 3 is a circuit diagram for explaining an upper impedance estimation technique in the power conversion device 10 according to a modified example of the embodiment. A second estimation method according to the embodiment is described below with reference to FIG. 3. This second estimation method may be used instead of the first estimation method.

The first estimation method uses the current $I_2$, whereas the second estimation method uses a current $I_3$. The current $I_3$ and the voltage $V_{Z3}$ in FIG. 3 can be measured by the current and the voltage acquired through the instrument current transformer 53a and the instrument voltage transformer 53b.

The concept of calculating the difference value $\Delta V$ is the same between the first estimation method and the second estimation method. Therefore, $\Delta V$ can be obtained by the above-mentioned equation (4). However, because the current to be measured in the second estimation method is different from that in the first estimation method, the calculation equation is the following equation (6).

[Math. 6]

$$Z_2 = \frac{\Delta V}{I_3} \quad (6)$$

As described above, the calculation unit 301 according to the embodiment calculates an estimated value of the upper impedance $Z_2$ between the power conversion circuit 14 and the power system based on the difference value $\Delta V$. The calculation unit 301 calculates the estimated value of the upper impedance $Z_2$ according to the equation (5) or the equation (6). The equation (5) or the equation (6) is a predetermined equation in which the relationship between the impedance of each element included in the AC filter circuit 15 and the current value and voltage value appearing in the vicinity thereof is predetermined.

If the difference value $\Delta V$ of the equation (4) is known, use of the respective impedance values of the AC reactor 15a and the AC capacitor 15b, and the measured values of the current or voltage appearing in the vicinity of these circuit elements makes it possible to solve the equation (5) or the equation (6). Solving the equation (5) or the equation (6)

enables the power conversion device 10 alone to calculate the estimated value of the upper impedance $Z_2$ accurately. Therefore, it is not necessary to rely on the external sensor function such as a host monitoring device.

In the no-output state, the power conversion device 10 only stops or has zero output. In the no-output state, no uncommon control operation such as generation of disturbance is performed on the power conversion device 10. Since the operation is not hindered by the generation of disturbance, the power conversion operation of the power conversion device 10 is not hindered while the estimated value of the upper impedance $Z_2$ can be calculated accurately.

When the first estimation method described with reference to FIG. 2 is used, the calculation unit 301 calculates an estimated value of the upper impedance $Z_2$ based on the difference value $\Delta V$, the impedance $Z_3$ of the AC capacitor 15$b$, the inverter output current $i_{inv}=I_1$, and the AC output voltage $V_{out}=V_{Z3}$ detected by the PLL circuit 30 during operation of the power conversion circuit 14. The first estimation method does not use the current value acquired via the instrument current transformer 55 in the calculation. Therefore, there is an advantage that the instrument current transformer 55 may be omitted.

When the second estimation method described with reference to FIG. 3 is used, the calculation unit 301 calculates an estimated value of the upper impedance $Z_2$ based on the ratio of the difference value $\Delta V$ and $I_3$ that is the value of the AC output current $i_{out}$ measured by a current meter. The second estimation method does not use the current value acquired via the instrument current transformer 53$a$ in the calculation. Therefore, there is an advantage that the instrument current transformer 53$a$ may be omitted. In addition, the second estimation method has an advantage that the upper impedance $Z_2$ can be estimated regardless of the constant of the AC filter circuit 15. Furthermore, there is an advantage that the estimated value of the upper impedance $Z_2$ can be easily calculated according to the equation (6).

The embodiment also has the following advantages. A system accident occurs, for example, for a time on the order of several milliseconds. Data communication between the host monitoring device and the power conversion device 10 takes time. If data communication takes time, there is a problem in which system accidents cannot be controlled at high speed. In this regard, with the embodiment, high-speed signal transmission and arithmetic processing performed inside the power conversion device 10 enables calculation of the estimated value of the upper impedance $Z_2$. Furthermore, the estimated value may be utilized for phase command value correction and the like. As described above, since the data communication with the host monitoring device is not required in the embodiment, there is an advantage that a response to the system accident can be performed at high speed. Therefore, the control responsiveness at the time of system disturbance is dramatically improved.

According to the embodiment, the calculation unit 301 is built in the PLL circuit 30. Since the calculation unit 301 can use the functions that the PLL circuit 30 has, there is also an advantage that the upper impedance estimation function can be implemented with a small number of additional configurations.

In a case in which the DC power supply device 8 includes a solar cell panel, at a time of stop of the power conversion circuit 14 operation at night when solar power is not generated, the calculation unit 301 may acquire the first voltage value. This enables the power conversion circuit 14 to obtain the information necessary for the upper impedance estimation without hindering the power conversion operation.

Phase Correction Control of Embodiment

An example of a control improvement technique using the upper impedance is described below. For example, it is conceivable that low voltage ride through (LVRT) occurs. LVRT means that the upper system voltage $V_{ac}$ in FIG. 2 momentarily drops due to a system accident. Due to LVRT, the upper system voltage $V_{ac}$ may drop to 0% at the maximum.

While LVRT occurs, the PLL circuit 30 cannot correctly execute the calculation. As an example of countermeasures, it is conceivable to perform current control during the accident by using the calculation result of the PLL circuit 30 before the accident. However, this countermeasure may cause steady-state deviation. This is because the output state of the power conversion circuit 14 may be significantly different between before the accident and during the accident.

Then, in the embodiment, the steady-state deviation is reduced or eliminated by reflecting the estimated value of the upper impedance $Z_2$, and the phase state calculated from the inverter output current $i_{inv}$, into the calculation result of the PLL circuit 30 before the accident.

Specifically, the PLL circuit 30 calculates the phase correction amount $\Delta\theta$ based on the estimated value of the upper impedance $Z_2$ and a current command value. The PLL circuit 30 is constructed so as to correct the phase command value $\theta^*$ with the phase correction amount $\Delta\theta$.

For convenience, a subscript k for indicating the time series of the control step is added to the phase command value $\theta^*$. The phase command value calculated by the PLL circuit 30 in the control step k this time is set as the this-time phase command value $\theta^*_k$. In this case, the phase command value calculated in the last step k−1, which is one step before, is represented by the last-time phase command value $\theta^*_{k-1}$.

As an example, the PLL circuit 30 may calculate the phase correction amount $\Delta\theta$ based on a value obtained by multiplying the estimated value of the upper impedance $Z_2$ and the q-axis current command value $i^*_q$. The PLL circuit 30 may calculate the this-time phase command value $\theta^*_k$ by adding the phase correction amount $\Delta\theta$ to the last-time phase command value $\theta^*_{k-1}$. This can reduce or eliminate the steady-state deviation.

The calculation unit 301 may be provided in other parts than the PLL circuit 30. The calculation unit 301 may be provided at a part inside the power conversion device 10. For example, the calculation unit 301 may be added to either the power control command value calculation unit 31 or the power controller 34. The calculation unit 301 may be realized via software by adding an impedance estimation control logic and a phase correction logic to any of the control blocks provided inside the power conversion device 10. The calculation unit 301 may be realized by modifying any of the control circuits provided inside the power conversion device 10 in terms of hardware. Alternatively, for the calculation unit 301, an impedance estimation circuit unit and a phase correction unit may be independently added as hardware-dedicated circuits inside the power conversion device 10.

Each function included in the power conversion device 10 according to the embodiment may be provided as an upper impedance estimation method or a phase correction method.

REFERENCE SIGNS LIST

8: DC power supply device
10: power conversion device
12: DC side relay
13: DC capacitor
14: power conversion circuit
15: AC filter circuit
15a: AC reactor
15b: AC capacitor
17: AC side relay
18: MPPT controller
19: First subtractor
20: DC-voltage controller
21: First adder
22: First coordinate conversion unit
23: Second subtractor
24: Current controller
25: PWM drive circuit
30: Phase-locked loop (PLL) circuit
31: Power control command value calculation unit
32: Second coordinate conversion unit
33: Third coordinate conversion unit
34: Power controller
40: Power grid
51, 53a, 55: Instrument current transformer
52, 53b, 54: Instrument voltage transformer
301: Calculation unit
$i_d$: d-axis output current
$i_{inv}$: Inverter output current (first AC output current)
$i_{out}$: AC output current (second AC output current)
$i_q$: q-axis output current
$V_{ac}$: Upper system voltage
$V_{inv}$: Inverter output voltage (first AC output voltage)
$V_{out}$: AC output voltage (second AC output voltage)
$Z_2$: Upper impedance (system impedance)
$\Delta V$: Difference value
$\Delta \theta$: Phase correction amount
$\theta^*$: Phase command value

The invention claimed is:

1. A power conversion device, comprising:
a power conversion circuit configured to convert direct current (DC) input power from a DC power supply to output a first alternating current (AC) output current and a first AC output voltage;
an AC filter circuit connected in series to the power conversion circuit, the AC filter circuit configured to filter the first AC output current and the first AC output voltage to generate a second AC output current and a second AC output voltage, the second AC output current being output from a connection point between a reactor and a capacitor, the second AC output voltage being applied to the capacitor; and
calculation circuitry configured to calculate an estimated value of an upper impedance based on a difference value between a first voltage value and a second voltage value, the first voltage value being a value of the second AC output voltage at a time of stop of the power conversion circuit, or at a time of zero output from the power conversion circuit or at a time of a certain amount of output from the power conversion circuit, the second voltage value being a value of the second AC output voltage during operation in which the power conversion circuit outputs output power,
wherein the calculation circuitry is configured to calculate the estimated value of the upper impedance based on a predetermined fraction so as to have a predetermined numerator and a predetermined denominator,
wherein the predetermined numerator includes a value obtained by multiplying the difference value by an impedance of the capacitor, and
wherein the predetermined denominator includes a value obtained by subtracting a first value from a second value, the second value being a value obtained by multiplying a value of the first AC output current by the impedance of the capacitor, the first value being a value of the second AC output voltage during the operation of the power conversion circuit.

2. The power conversion device according to claim 1, further comprising
a current meter for measuring the second AC output current, wherein the calculation circuitry is configured to calculate the estimated value of the upper impedance based on a ratio of the difference value and a value of the second AC output current measured by the current meter.

3. The power conversion device according to claim 1, wherein:
the DC power supply includes a solar cell panel; and
the calculation circuitry is configured to acquire the first voltage value at a time of stop of the power conversion circuit operation at night.

4. A power conversion device, comprising:
a power conversion circuit configured to convert direct current (DC) input power from a DC power supply to output a first alternating current (AC) output current and a first AC output voltage;
an AC filter circuit connected in series to the power conversion circuit, the AC filter circuit configured to filter the first AC output current and the first AC output voltage to generate a second AC output current and a second AC output voltage, the second AC output current being output from a connection point between a reactor and a capacitor, the second AC output voltage being applied to the capacitor;
calculation circuitry configured to calculate an estimated value of an upper impedance based on a difference value between a first voltage value and a second voltage value, the first voltage value being a value of the second AC output voltage at a time of stop of the power conversion circuit, or at a time of zero output from the power conversion circuit or at a time of a certain amount of output from the power conversion circuit, the second voltage value being a value of the second AC output voltage during operation in which the power conversion circuit outputs output power; and
phase-locked loop circuitry configured to receive a value of the second AC output voltage and to output a phase command value based on a phase of the second AC output voltage,
wherein the phase-locked loop circuitry includes the calculation circuitry, and
the calculation circuitry is configured to calculate the difference value from the first voltage value and the second voltage value, the first voltage value being a value of the second AC output voltage that is input to the phase-locked loop circuitry at the time of stop of the power conversion circuit, or at the time of zero output from the power conversion circuit or at the time of a certain amount of output from the power conversion circuit, the second voltage value being a value of the second AC output voltage that is input to the phase-locked loop circuitry during the operation of the power conversion circuit.

5. A power conversion device, comprising:

a power conversion circuit configured to convert direct current (DC) input power from a DC power supply to output a first alternating current (AC) output current and a first AC output voltage;

an AC filter circuit connected in series to the power conversion circuit, the AC filter circuit configured to filter the first AC output current and the first AC output voltage to generate a second AC output current and a second AC output voltage, the second AC output current being output from a connection point between a reactor and a capacitor, the second AC output voltage being applied to the capacitor;

calculation circuitry configured to calculate an estimated value of an upper impedance based on a difference value between a first voltage value and a second voltage value, the first voltage value being a value of the second AC output voltage at a time of stop of the power conversion circuit, or at a time of zero output from the power conversion circuit or at a time of a certain amount of output from the power conversion circuit, the second voltage value being a value of the second AC output voltage during operation in which the power conversion circuit outputs output power; and phase-locked loop circuitry configured to receive a value of the second AC output voltage and to output a phase command value based on a phase of the second AC output voltage, wherein the phase-locked loop circuitry is configured to correct the phase command value with a correction amount calculated based on the estimated value of the upper impedance and a current command value.

* * * * *